United States Patent [19]

Eisenberg

[11] 4,188,408

[45] * Feb. 12, 1980

[54] PROTECTED IRON TRACER COMPOSITION AND METHOD OF MAKING

[75] Inventor: Sylvan Eisenberg, San Francisco, Calif.

[73] Assignee: Microtracers Inc., San Francisco, Calif.

[*] Notice: The portion of the term of this patent subsequent to Jun. 14, 1994, has been disclaimed.

[21] Appl. No.: 597,298

[22] Filed: Jul. 18, 1975

Related U.S. Application Data

[63] Continuation-in-part of Ser. No. 542,357, Jan. 20, 1975, Pat. No. 4,029,820.

[51] Int. Cl.² ............................................. A23K 1/175
[52] U.S. Cl. ..................................... 426/74; 426/250; 426/97; 426/302; 426/807; 252/466 J
[58] Field of Search .................. 426/74, 97, 289, 293, 426/302, 648, 806, 807; 424/16, 126, 128, 149, 295, 357; 252/62.55, 439, 466 J; 423/508

[56] References Cited

U.S. PATENT DOCUMENTS

| | | | |
|---|---|---|---|
| 2,295,643 | 9/1942 | Emery | 426/74 |
| 2,359,413 | 10/1944 | Freedman | 426/74 |
| 2,868,644 | 1/1959 | Eisenberg | 99/2 |
| 2,973,265 | 2/1961 | Gillis | 426/628 |
| 3,807,981 | 4/1974 | Contrea | 426/74 |

OTHER PUBLICATIONS

Hackh's Chemical Dictionary—Grant, McGraw-Hill Book Co., N.Y., 1969, pp. 478, 514.
Condensed Chemical Dictionary, 8th Ed., p. 778, Hawley, Van Nostrand Reinhold in N.Y. 1971.

*Primary Examiner*—Hiram H. Bernstein

[57] ABSTRACT

Finely divided iron is mechanically mixed in water to add a coating to the iron particles. Present in the water to protect the iron from corrosion loss during such processing is a small amount of sodium carbonate or tri-sodium phosphate or sodium silicate. The inhibitor is adsorbed on the eventual iron particles after the water is driven off.

12 Claims, No Drawings

PROTECTED IRON TRACER COMPOSITION AND METHOD OF MAKING

RELATED APPLICATIONS

This application is a continuation-in-part of my co-pending application Ser. No. 542,357 filed Jan. 20, 1975 for TRACERS and now U.S. Pat. No. 4,029,820 issued June 14, 1977. It is also related to my co-pending application Ser. No. 437,037, filed Jan. 28, 1974 for TRACER CONTAINING COMPOSITIONS and now U.S. Pat. No. 4,152,271 issued May 1, 1979.

An object of the invention is to protect the iron grit from loss through corrosion when it is being mechanically mixed in water with food colors, as in the aforementioned application Ser. No. 437,037.

A further object of the invention is to protect the iron-selenium tracers of the aforementioned application Ser. No. 542,357 from corrosion during processing and to protect the selenium from being reduced to lower valence states.

I have discovered that when iron grit, 35 mesh to 325 mesh, is merely wetted with water there is only a slow rate of corrosion which is indicated by a temperature rise of only 0.3° C. in 30 minutes, whereas when the same iron grit was mixed in a mechanical mixer, such as a four quart Hobart mixer equipped with a wire whip, the temperature increased more than 40° C. within 20 minutes. Sufficient heat was generated to volatilize essentially all of the added water, i.e. the water that was used as the vehicle for the addition of the food color coating to the iron grit described in the earlier filed of my two above-identified patent applications.

I have found that sodium carbonate, tri-sodium phosphate, and sodium silicate are effective in controlling corrosion consequent to the mechanical mixing of iron grit with water.

In the mechanical mixing of iron grit with water the corrosion rate of the iron grit is directly proportional to the degrees per minute temperature rise of the mixture. Table I indicates how the corrosion was decreased by the addition of each of the three inhibitor materials:

TABLE I

| INHIBITOR-MGMS/1000 GMS. IRON ppm | SLOPE °/min. |
|---|---|
| None | |
| 0 | 2.24 |
| Sodium Carbonate | |
| 100 | 1.16 |
| 250 | 0.19 |
| 1000 | −0.2 |
| Tri-sodium Phosphate 12H$_2$O | |
| 100 | 1.50 |
| 250 | 0.28 |
| 1000 | 0.0 |
| Sodium Silicate, tech. powd. | |
| 250 | 2.00 |
| 1000 | 0.484 |

Thus, 100 parts of sodium carbonate per million parts of iron grit cut the corrosion rate in half, and an increase in the sodium carbonate up to 1000 parts per million parts of iron prevented all corrosion.

When certain dyes are added to the water, as in may application Ser. No. 437,037, to color the iron grit by wet blending, the dye material is rapidly degraded in the absence of one of the three inhibitors. Without an inhibitor losses of the dyes range between 50% and 100%, whereas with an adequate amount of inhibitor, from about 500 ppm to about 4000 ppm based on iron weight, there is essentially no loss of dye material. Corrosion rates, i.e. dye degradation rates, as measured by the initial slopes of temperature/curves are set forth in Table II:

TABLE II

| FD&C DYE 1% | SODIUM CARBONATE ppm | SLOPE °/minute |
|---|---|---|
| Blue #1 | 0 | 5.50 |
| | 1000 | 0.00 |
| | 2000 | −0.38 |
| Blue #2 | 0 | 5.20 |
| | 2000 | −0.51 |
| Yellow #6 | 0 | 2.70 |
| | 2000 | −0.44 |
| Red #2 | 0 | 1.08 |
| | 2000 | −0.36 |
| Red #3 | 0 | 0.80 |
| | 2000 | −0.40 |

It will be appreciated that higher levels of inhibitor are required when mixing and drying large batches of material in commercial ribbon mixer (500 lbs. of iron grit for example) than are required for the small laboratory batches of about 1000 gms. of iron grit which were employed to obtain the data of Table II. The above figures of about 500 ppm. to about 4000 ppm based on iron weight are for the larger commercial batches.

When the dyes of Table II are adsorbed on reduced iron, the particle size being preferably such that essentially 100% passes through 100 mesh (149 microns) and less than 50% passes through 325 mesh (44 microns), and the color particles are later mixed with materials of relatively high water activity, e.g. animal feeds, the dyes are slowly degraded particularly when the animal feed mix is exposed to steam and pressure as in pelleting. When, in addition to the dye material, one of the above-identified inhibitors, preferably sodium carbonate, is also adsorbed on the reduced iron there is imparted to the dye by the inhibitor a stabilizing effect against subsequent slow degradation of the dye material. This is shown by Table III which follows. Here the 1% dyes were adsorbed on reduced iron of 100–325 mesh with and without 1000 ppm of sodium carbonate. The colored products were then added to water, 1 gm. to 50 ml., and the percentage of dye retained was determined spectrophotometrically. It is to be pointed out that even the three days exposure to water probably represents a considerably greater exposure of the colored iron products to water than would normally occur to such products when blended in nominally dry mixes such as animal feed.

TABLE III

| | DYE RETAINED AFTER | |
|---|---|---|
| FD&C DYE | 3 DAYS % | 6 DAYS % |
| Red #2 | 26 | 4 |
| Red #2 + Sod. carbonate | 68 | 21 |
| Red #3 | 88 | 43 |
| Red #3 + Sod. carbonate | 98 | 76 |
| Yellow #6 | 25 | 15 |
| Yellow #6 + Sod. carbonate | 81 | 27 |
| Blue #1 | 52 | 9 |
| Blue #1 + Sod. carbonate | 92 | 57 |
| Blue #2 | 38 | 17 |
| Blue #2 + Sod. carbonate | 76 | 16 |

In my above-identified co-pending application Ser. No. 542,357, instead of food color dyes there was adsorbed on finely powdered reduced iron sodium selenite or sodium selenate. The following formulation and description are given:

| Reduced Iron | 500 | lbs. |
|---|---|---|
| Sodium Selenite | 11.8 | lbs. |
| Sodium Carbonate | 0.5 | lbs. |
| Water | 20 | lbs. |

The reduced iron is finely powdered essentially 100% passing 100 mesh (149 microns) and less than 50% passing 325 mesh (44 microns). The sodium selenite is anhydrous powder. The sodium carbonate is also anhydrous powder. It is included in the formulation to protect the iron from corrosion during processing and also serves to protect the selenium compound from being reduced to lower valence states, such as elemental selenium or hydrogen selenide. The salts are first dissolved in the water. The resulting solution is then transferred to a mixer which has been previously charged with the reduced iron. The mixer is sealed and the contents are mixed until uniform. Suction is then applied to the mixer and the mixer is heated to induce drying. When dry, samples are taken from the mixer and assayed. The product as formulated should contain 1.05% selenium. Additional reduced iron may be incorporated in the mix if necessary to meet a preset specification of 1.00% selenium plus or minus a preset tolerance.

What is claimed is:

1. A composition of matter comprising a major portion of finely divided iron particles of about 35–325 mesh having adsorbed thereon a minor portion of a compound selected from the class consisting of sodium carbonate, tri-sodium phosphate and sodium silicate, said iron being selected from the class consisting of iron grits and reduced iron.

2. The composition of claim 1 wherein the amount of the adsorbed compound is about 100–4000 parts per million parts by weight of iron.

3. A tracer composition for incorporation into animal feed comprising a major portion of finely divided iron particles of about 35–325 mesh having adsorbed thereon a minor portion of a compound selected from the class consisting of sodium carbonate, tri-sodium phosphate and sodium silicate, said iron being selected from the class consisting of iron grits and reduced iron.

4. The tracer composition of claim 3 wherein the amount of the adsorbed compound is about 100–4000 parts per million parts by weight of iron.

5. The tracer composition of claim 4 wherein the iron particles have also adsorbed thereon a water-soluble dye.

6. The tracer composition of claim 5 wherein the dye is selected from the class consisting of certified FD&C dyes.

7. The tracer composition of claim 6 wherein the iron is iron grit.

8. The tracer composition of claim 4, the iron being reduced iron of about 100–325 mesh, the iron having also adsorbed thereon from about 0.4% to about 4% by weight of selenium in the form of sodium selenite or sodium selenate.

9. A composition of matter in the form of a generally homogeneous admixture comprised of a major portion of a bulk ingredient, a minor portion of a micro-ingredient, and a tracer provided in a preselected ratio with said micro-ingredient, said tracer comprising a major portion of finely divided iron particles of about 35–325 mesh having adsorbed thereon a minor portion of a compound selected from the class consisting of sodium carbonate, tri-sodium phosphate and sodium silicate, said iron being selected from the class consisting of iron grits and reduced iron.

10. The composition of claim 9 wherein the amount of the adsorbed compound is about 100–4000 parts per million parts by weight of iron.

11. A method for producing a ferro-magnetic tracer composition for animal feed comprising mechanically mixing together finely divided iron particles of about 35–325 mesh and a dilute solution of sodium carbonate in water, and driving off the water and recovering the iron with adsorbed sodium carbonate, said iron being selected from the class consisting of iron grits and reduced iron.

12. The method of claim 11, the water beng present in an amount to wet the iron and the sodium carbonate being present in an amount to form an adsorbed coating of about 100–4000 parts by weight per million parts of iron.

* * * * *